United States Patent
Major et al.

(10) Patent No.: US 12,522,277 B2
(45) Date of Patent: Jan. 13, 2026

(54) FORKLIFT STEER-BY-WIRE CONTROL SYSTEM

(71) Applicant: Toyota Material Handling, Inc., Columbus, IN (US)

(72) Inventors: Joseph Major, Indianapolis, IN (US); Kevin Partridge, Columbus, IN (US)

(73) Assignee: Toyota Material Handling, Inc., Columbus, IN (US)

( * ) Notice: Subject to any disclaimer, the term of this patent is extended or adjusted under 35 U.S.C. 154(b) by 870 days.

(21) Appl. No.: 17/851,498

(22) Filed: Jun. 28, 2022

(65) Prior Publication Data

US 2023/0026718 A1 Jan. 26, 2023

Related U.S. Application Data

(60) Provisional application No. 63/223,600, filed on Jul. 20, 2021.

(51) Int. Cl.
*B62D 5/00* (2006.01)
*B62D 5/04* (2006.01)
*B62D 6/00* (2006.01)
*B66F 9/075* (2006.01)

(52) U.S. Cl.
CPC ............ *B62D 5/001* (2013.01); *B62D 5/006* (2013.01); *B62D 5/0427* (2013.01); *B62D 5/0448* (2013.01); *B62D 6/002* (2013.01); *B62D 6/008* (2013.01); *B66F 9/07568* (2013.01)

(58) Field of Classification Search
CPC ...... B62D 5/001; B62D 5/006; B62D 5/0427; B62D 5/0448; B62D 6/002; B62D 6/008; B66F 9/07568; B66F 9/0755; B66F 9/24
See application file for complete search history.

(56) References Cited

U.S. PATENT DOCUMENTS

| | | |
|---|---|---|
| 4,712,027 A | 12/1987 | Karidis et al. |
| 5,347,458 A | 9/1994 | Serizawa et al. |
| 5,908,457 A | 6/1999 | Higashira et al. |
| 6,079,513 A | 6/2000 | Nishizaki et al. |
| 6,097,286 A | 8/2000 | Discenzo |
| 6,219,604 B1 | 4/2001 | Dilger et al. |
| 6,370,460 B1 | 4/2002 | Kaufmann et al. |
| 6,535,806 B2 | 3/2003 | Millsap et al. |
| 6,554,095 B2 | 4/2003 | Zheng et al. |
| 6,678,595 B2 | 1/2004 | Zheng et al. |
| 6,678,596 B2 | 1/2004 | Husain et al. |
| 6,681,882 B2 | 1/2004 | Zheng et al. |
| 6,687,588 B2 | 2/2004 | Demerly et al. |
| 6,694,239 B1 | 2/2004 | Yao et al. |
| 6,712,175 B2 | 3/2004 | Kind et al. |
| 6,728,615 B1 | 4/2004 | Yao et al. |
| 6,751,539 B2 | 6/2004 | Uenuma et al. |
| 6,782,969 B2 | 8/2004 | Kodama et al. |
| 6,799,105 B2 | 9/2004 | Stout et al. |
| 6,799,654 B2 | 10/2004 | Menjak et al. |

(Continued)

*Primary Examiner* — Christopher B Wehrly
(74) *Attorney, Agent, or Firm* — Barnes & Thornburg

(57) ABSTRACT

A steer-by-wire control system adapted for use with a material handling vehicle such as a forklift includes a controller programmed to receive input indicative of a desired direction of travel of the material handling vehicle and to control an actuator coupled with the steered wheels of the material handling vehicle to change the direction of travel of the vehicle.

19 Claims, 8 Drawing Sheets

(56) References Cited

U.S. PATENT DOCUMENTS

| | | |
|---|---|---|
| 6,801,840 B2 | 10/2004 | Kodama et al. |
| 6,843,344 B2 | 1/2005 | Kodama et al. |
| 6,871,127 B2 | 3/2005 | Dominke et al. |
| 6,886,656 B2 | 5/2005 | Fujioka et al. |
| 6,913,109 B2 | 7/2005 | Kodama et al. |
| 6,915,194 B2 | 7/2005 | Kodama et al. |
| 6,918,460 B2 | 7/2005 | Tajima et al. |
| 6,938,725 B2 | 9/2005 | Fujioka et al. |
| 6,973,989 B2 | 12/2005 | Williams |
| 7,004,278 B2 | 2/2006 | Sugitani et al. |
| 7,034,483 B2 | 4/2006 | Takahashi et al. |
| 7,130,728 B2 | 10/2006 | Suzuki |
| 7,191,864 B2 | 3/2007 | Sugitani et al. |
| 7,207,411 B2 | 4/2007 | Duits et al. |
| 7,234,563 B2 | 6/2007 | Ogawa et al. |
| 7,278,509 B2 | 10/2007 | Schroder et al. |
| 7,295,905 B2 | 11/2007 | Yao et al. |
| 7,325,644 B2 | 2/2008 | Sakai |
| 7,418,326 B2 | 8/2008 | Ogawa et al. |
| 7,558,657 B2 | 7/2009 | Manken et al. |
| 7,581,616 B2 | 9/2009 | Goto et al. |
| 7,676,309 B2 | 3/2010 | Tamaki et al. |
| 7,832,522 B2 | 11/2010 | Akuta et al. |
| 7,849,955 B2 | 12/2010 | Crabill et al. |
| 7,885,742 B2 | 2/2011 | Yamazaki et al. |
| 7,908,056 B2 | 3/2011 | Hwang |
| 8,010,254 B2 | 8/2011 | Chai et al. |
| 8,224,528 B2 | 7/2012 | Hayama et al. |
| 8,544,592 B2 | 10/2013 | Goutsu et al. |
| 8,554,415 B2 | 10/2013 | Takazato |
| 8,589,029 B2 | 11/2013 | Egenfeldt |
| 8,706,354 B2 | 4/2014 | Imamura et al. |
| 8,718,873 B2 | 5/2014 | Kushiro |
| 8,855,859 B2 | 10/2014 | Hayama |
| 8,855,862 B2 | 10/2014 | Tashiro |
| 9,050,999 B2 | 6/2015 | Kuipers et al. |
| 9,108,667 B2 | 8/2015 | Hayama et al. |
| 9,327,765 B2 | 5/2016 | Takeda |
| 9,446,792 B2 | 9/2016 | Takeda |
| 9,469,335 B2 | 10/2016 | Sato et al. |
| 9,505,428 B2 | 11/2016 | Chai et al. |
| 9,623,900 B2 | 4/2017 | Yukitake |
| 9,771,102 B2 | 9/2017 | Sakurai |
| 9,994,249 B2 | 6/2018 | Kageyama et al. |
| 10,011,297 B2 | 7/2018 | Oya et al. |
| 10,017,206 B2 | 7/2018 | Kawaguchi et al. |
| 10,272,941 B2 | 4/2019 | Sakamaki et al. |
| 10,399,597 B2 | 9/2019 | Varunjikar et al. |
| 10,414,288 B2 | 9/2019 | Mangette |
| 10,449,999 B2 | 10/2019 | During et al. |
| 10,461,606 B2 | 10/2019 | Ognibene et al. |
| 10,507,493 B2 | 12/2019 | Houston et al. |
| 2003/0230448 A1 | 12/2003 | Guldner et al. |
| 2006/0200291 A1 | 9/2006 | Wroblewski |
| 2013/0292201 A1* | 11/2013 | Yamanaka ............ B23P 19/04 180/402 |
| 2015/0330497 A1 | 11/2015 | Amano et al. |
| 2018/0229989 A1 | 8/2018 | Goshima |
| 2018/0251150 A1 | 9/2018 | Ognibene et al. |
| 2018/0304923 A1* | 10/2018 | Kilz .................... B62D 6/002 |
| 2019/0118853 A1 | 4/2019 | Delmarco et al. |
| 2019/0168807 A1 | 6/2019 | Polmans |
| 2019/0176882 A1 | 6/2019 | Thompson et al. |
| 2019/0256133 A1 | 8/2019 | Tsubaki |
| 2019/0300051 A1 | 10/2019 | Inoue et al. |
| 2019/0359248 A1 | 11/2019 | Tsubaki |
| 2019/0367075 A1 | 12/2019 | Kodera |
| 2020/0023893 A1 | 1/2020 | Naik et al. |
| 2020/0023894 A1 | 1/2020 | Naik et al. |
| 2020/0047764 A1 | 2/2020 | Yamashita et al. |

\* cited by examiner

FORKLIFT STEER-BY-WIRE CONTROL SYSTEM

CROSS REFERENCE TO RELATED APPLICATIONS

This application claims priority to and the benefit of U.S. Provisional Patent Application No. 63/223,600, filed 20 Jul. 2021, the disclosure of which is now expressly incorporated herein by reference.

FIELD OF THE DISCLOSURE

The present disclosure relates generally to steering systems, and more specifically to steering systems having a steer-by-wire controller for directing the steered wheels of a vehicle.

BACKGROUND

Hydraulic motors and actuators are used in on and off-highway vehicles such as in the material handling, agriculture, and automotive industries. Hydraulic motors, valves, and actuators may control a variety of vehicle features such as steering, lifting, tilting, rotating, etc. The vehicles may be used to move heavy loads that are supported on a bed or lift mechanism of the vehicle.

Using hydraulics is a relatively reliable and durable way to support and move loads. However, there are some negatives associated with hydraulics. As one example, a hydraulic system may experience power loses throughout the components of the system causing the hydraulic system to lose efficiency. While most hydraulic functions, for example in a forklift, are used with an intermediate frequency, steering systems may maintain on demand power at all times during operation. This may cause hydraulic steering systems to be especially inefficient. Other negatives associated with hydraulic systems may include low resolution, multiple components using space, time consuming installation, & frequent maintenance.

Using electric actuators and steer-by-wire controllers in vehicle steering systems may overcome some of the disadvantages of the hydraulic systems. Such electric actuators may be controlled using steer-by-wire controllers connected with the electric actuator. There is a desire to develop sophisticated steer-by-wire systems for use with the electric actuators to provide accurate steering for the vehicles.

SUMMARY

The present disclosure may comprise one or more of the following features and combinations thereof.

According to an aspect of the disclosure, a steer-by-wire control system includes a steering assembly and a controller. The steering assembly includes steered wheels, a tire angle sensor, a steering input system, and an actuator. The steered wheels supported on ground underlying the steered wheels. The steered wheels are adapted to turn relative to the ground to set a direction of travel of the material handling vehicle. The tire angle sensor is configured to generate a tire angle signal indicative of a measured angle of the steered wheels. The steering input system is configured to generate a steering signal indicative of a desired angle of the steered wheels.

The actuator includes a ball screw nut, an actuator rod, and a rotation position sensor. The ball screw nut is configured to rotate about an axis to cause the actuator rod to translate axially along the axis relative to the ball screw nut. The actuator rod is coupled with the steered wheels to change an angle of the steered wheels relative to the ground in response to translating axially relative to the ball screw nut. The rotation position sensor is configured to generate an angular position signal indicative of an angular position of the ball screw nut relative to the axis.

The controller is connected with the steering input system, the tire angle sensor, and the actuator. The controller is configured to vary the angle of the steered wheels within a limited range of angles. The controller programmed to: determine a calculated linear position of the actuator rod relative to the ball screw nut based on the tire angle signal received from the tire angle sensor, determine a maximum angular limit value for rotating the ball screw nut in a first rotational direction based on the calculated linear position of the actuator rod and the angular position signal received from the rotational position sensor, rotate the ball screw nut in the first direction to translate the actuator rod axially relative to the ball screw nut based on the input signal received from the steering input system to change the angle of the steered wheels, and block the ball screw nut from rotating in the first direction beyond the maximum angular limit so that the actuator rod does not translate axially beyond a predetermined maximum stroke limit and the angle of the steered wheels is maintained within the limited range of angles.

In some embodiments, the step of determining the calculated linear position of the actuator rod includes interpolating the calculated linear position based on the tire angle signal using a look-up table. In some embodiments, the controller is programmed to rotate the ball screw nut in the first direction by an amount based on the input signal received from the steering input system according to a lock-to-lock ratio and the controller is programmed to select the lock-to-lock ratio based on input received from an operator. In some embodiments, the lock-to-lock ratio is selected from a group of only three lock-to-lock ratio choices.

In some embodiments, the steering input system includes a steering input device and a tactile feedback device coupled with the steering input device. The tactile feedback device is configured to apply a resistance force to the steering input device to resist movement of the steering input device by an operator. The controller is programmed to select a default magnitude of the resistance force based on an input received from the operator.

In some embodiments, the steering input device is a steering wheel. The tactile feedback device may include an electromagnetic brake coupled with the steering wheel.

In some embodiments, the steering input device is a steering wheel. The tactile feedback device may include a stepper motor coupled with the steering wheel.

In some embodiments, the steering input system includes a steering input device and a tactile feedback device coupled with the steering input device. The tactile feedback device is configured to apply a resistance force to the steering input device to resist movement of the steering input device by an operator. The controller is programmed to increase the resistance force in response to an increase in revolutions per minute of the steered wheels.

In some embodiments, the steering input system includes a steering input device and a tactile feedback device coupled with the steering input device. The tactile feedback device is configured to apply a resistance force to the steering input device to resist movement of the steering input device by an operator. The controller is programmed to vary the resistance force applied to the steering input device in response to the steered wheels being moved to a center position in which the steered wheels direct the material handling vehicle in a straight line.

In some embodiments, the controller is programmed to reduce the resistance force in response to an expiration of a preset amount of time after the steered wheels were moved to the center position. In some embodiments, the controller is programmed to block an increase in the resistance force in response to the steered wheels being moved back to the center position unless the steered wheels have first been turned by an angle greater than a preset angle away from the center position.

In some embodiments, the steering input system includes a steering input device and a tactile feedback device coupled with the steering input device. The tactile feedback device is configured to apply a resistance force to the steering input device to resist movement of the steering input device by an operator and the controller is programmed to vary the resistance force in response to the steered wheels i) being moved to a center position and ii) the steered wheels rotating within a predetermined revolutions per minute range.

According to another aspect of the disclosure, a steer-by-wire control system includes a steering assembly and a controller. The steering assembly includes steered wheels, a tire angle sensor, a steering input system, and an actuator. The tire angle sensor is configured to generate a tire angle signal indicative of a measured angle of the steered wheels. The steering input system is configured to generate a steering signal indicative of a desired angle of the steered wheels. The actuator includes a rotor, an actuator rod, and a rotation position sensor. The rotor is configured to rotate to cause the actuator rod to move relative to the rotor. The actuator rod is coupled with the steered wheels. The rotation position sensor is configured to generate an angular position signal indicative of an angular position of the rotor relative to the axis.

The controller is programmed to: determine a linear position of the actuator rod relative to the rotor based on the tire angle signal, determine a maximum angular limit value for rotating the rotor in a first rotational direction based on the linear position of the actuator rod and the angular position signal, rotate the rotor in the first direction to move the actuator rod relative to the rotor based on the input signal in response to an angle of the rotor being less than the maximum angular limit value, and block the rotor from rotating in the first direction in response to the angle of the rotor being equal to or greater than the maximum angular limit value.

In some embodiments, the controller is programmed to stop electric power from going to the actuator to block the rotor from rotating in the first direction. In some embodiments, the controller is programmed to rotate the rotor in the first direction by an amount based on the input signal received from the steering input system according to a lock-to-lock ratio and the controller is programmed to select the lock-to-lock ratio based on input received from an operator.

In some embodiments, the steering input system includes a steering input device and a tactile feedback device coupled with the steering input device. The tactile feedback device is configured to apply a resistance force to the steering input device to resist movement of the steering input device by an operator. The controller is programmed to select a default magnitude of the resistance force based on an input received from the operator.

In some embodiments, the steering input system includes a steering input device and a tactile feedback device coupled with the steering input device. The tactile feedback device configured to apply a resistance force to the steering input device to resist movement of the steering input device by an operator. The controller is programmed to increase the resistance force in response to an increase in a travel speed of the steered wheels over the ground.

According to another aspect of the disclosure, a method includes rotating a steered wheel of a vehicle relative to ground in a first direction in response to rotation of a steering wheel of the vehicle, determining an angle of the steered wheel, and blocking rotation of the steered wheel in the first direction and allowing further rotation of the steering wheel in response to the angle of the steered wheel being equal to or greater than a maximum preset turn angle limit of the steered wheel.

According to another aspect of the disclosure, a method includes a number of steps. The method includes determining an angle of a steered wheel of a vehicle relative to ground, determining an angular position of a rotor relative to an actuator rod included in an actuator coupled with the steered wheel, determining a linear position of the actuator rod relative to the rotor based on the angle of the steered wheel, determining a maximum angular limit value for rotating the rotor in a first rotational direction based on the linear position of the actuator rod and the angular position of the rotor, rotating the rotor in the first direction to translate the actuator rod relative to the rotor in response to an angle of the rotor being less than the maximum angular limit value, and blocking the rotor from rotating in the first direction in response to the angle of the rotor being equal to or greater than the maximum angular limit value.

In some embodiments, the method includes applying a resistance force to a steering input device to resist movement of the steering input device and increasing the resistance force in response to an increase in revolutions per minute of the steered wheel.

In some embodiments, the method includes applying a resistance force to a steering input device to resist movement of the steering input device and increasing the varying the resistance force in response to the steered wheel moving to a center position.

These and other features of the present disclosure will become more apparent from the following description of the illustrative embodiments.

DETAILED DESCRIPTION OF THE DRAWINGS

Figure 1:
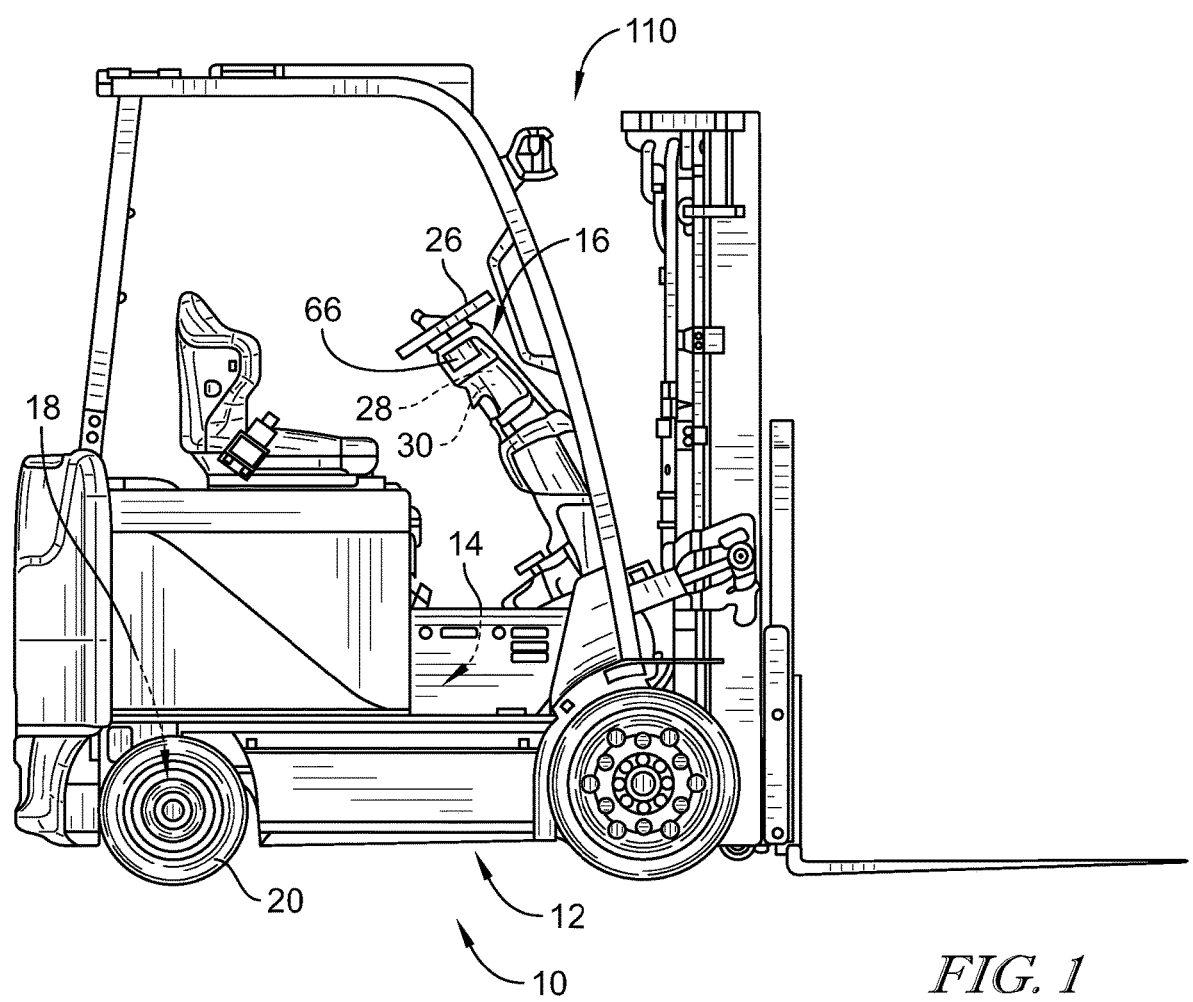
FIG. 1 is elevation side view of a material handling vehicle having a steer-by-wire control system according to the present disclosure.

For the purposes of promoting an understanding of the principles of the disclosure, reference will now be made to a number of illustrative embodiments illustrated in the drawings and specific language will be used to describe the same.

A steer-by-wire control system 10 in accordance with the present disclosure is integrated into a material handling vehicle 110 such as a forklift as shown in FIG. 1. The steer-by-wire control system 10 is configured to control an angle of steered wheels 20 of the vehicle 110 to adjust a direction of travel of the vehicle 110 and, optionally, to interface with and provide tactile feedback to an operator of the vehicle 110.

Figure 2:
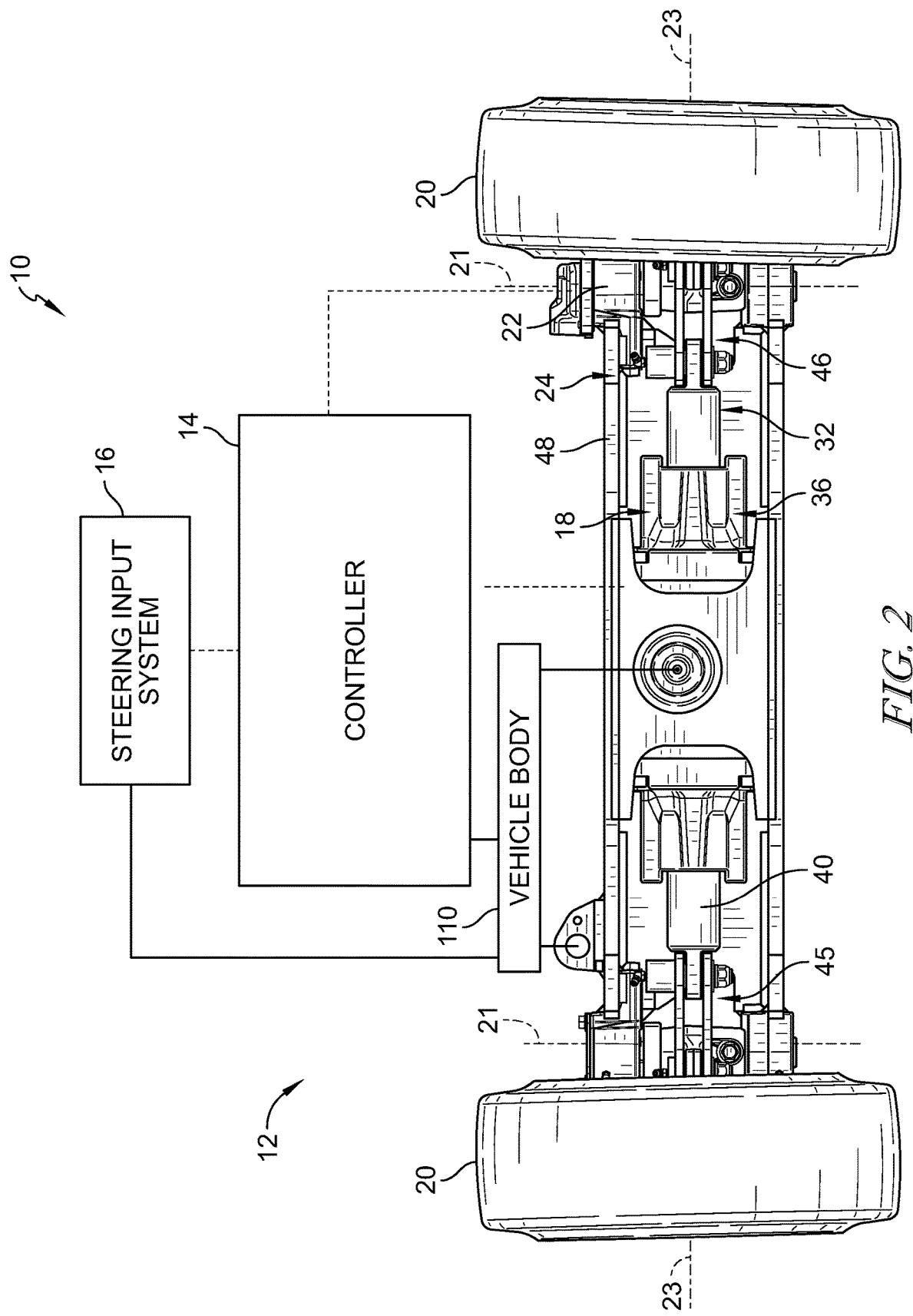
FIG. 2 is a diagrammatic view of the steer-by-wire control system showing that the system includes a controller and a steering assembly having steered wheels for moving the vehicle, an actuator mounted to a vehicle body and configured to turn the steered wheels, a steering input system for selecting a direction of the steered wheels, and a tire angle sensor located on the right side of the actuator and connected to the controller.
Figure 3:
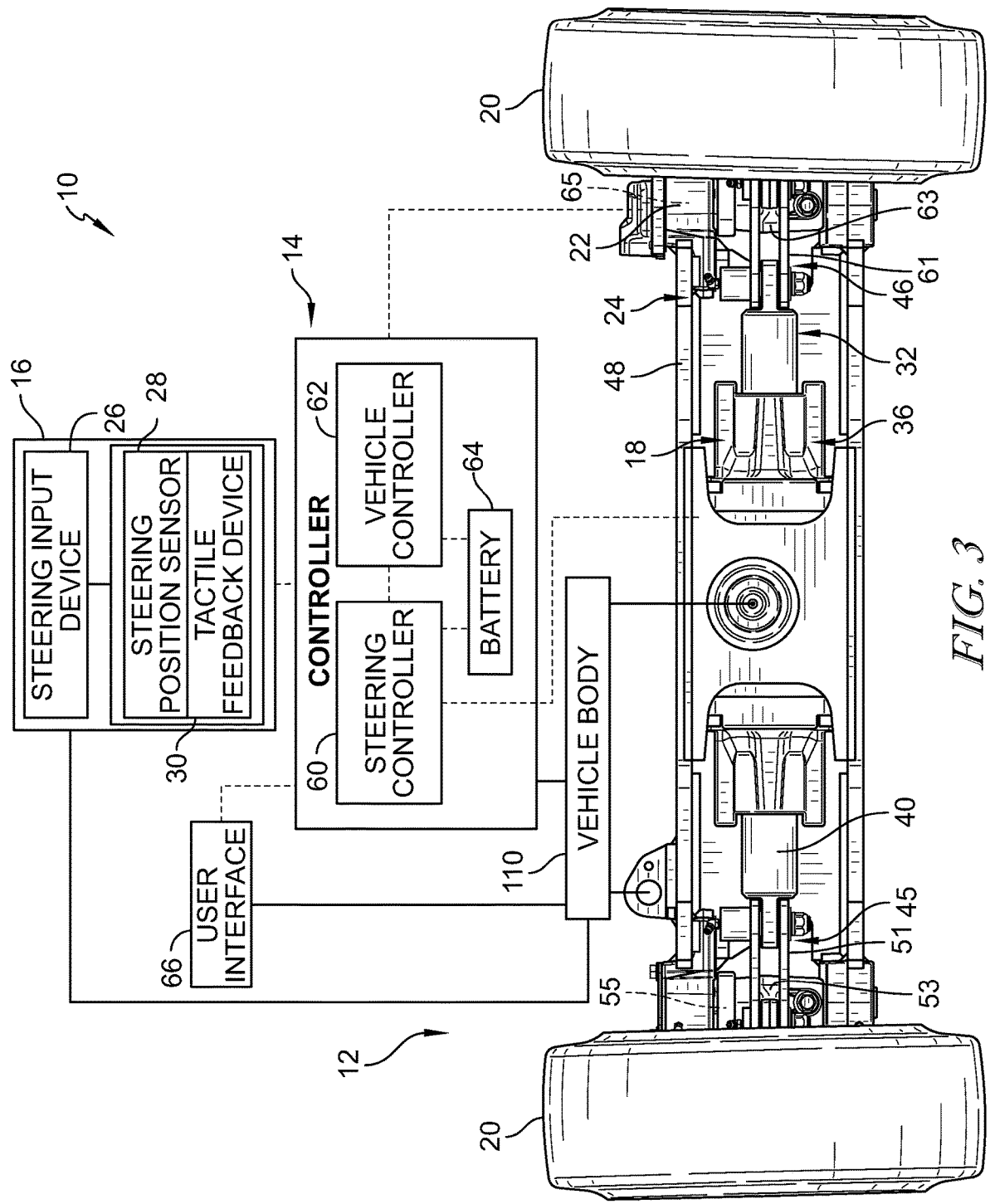
FIG. 3 is a diagrammatic view of the steer-by-wire control system showing that the steering input system includes a steering device, a steering position sensor, and a tactile feedback device and the controller includes a steering controller and a vehicle controller.

The steer-by-wire control system 10 includes a steering assembly 12 and a controller 14 as shown in FIGS. 2 and 3. The steering assembly 12 includes a steering input system 16, an actuator 18, steered wheels 20, and a tire angle sensor 22 that cooperate to vary a direction of travel of the vehicle 110. The controller 14 is connected with the steering input system 16, the tire angle sensor 22, and the actuator 18 and configured to vary an angle of the steered wheels 20 relative to ground within a limited and preset range of angles. The limited range of angles is selected to maximize the steering angle of the vehicle 110 while preventing the actuator 18 and/or other components from damage due to over stroking of the actuator. Illustratively, the tire angle sensor 22 includes a spring loaded potentiometer. The tire angle sensor 22 is powered by a regulated voltage supply and will output a voltage signal in which each degree of change results in a corresponding voltage change. The voltage change is a linear relationship to angle change in the illustrative embodiment.

The steering input system 16 included in the steering assembly 12 includes a steering input device 26, a steering position sensor 28, and a tactile feedback device 30 as shown in FIG. 3. The steering input device 26 is configured to direct the travel path of the vehicle 110 by means of the steered wheels 20. The steering position sensor 28 is configured to detect a position of the steering input device 26 and generate a signal indicative of the position usable by the controller 14 to adjust the actuator 18 and, thus, adjust an angle of the steered wheels 20. The tactile feedback device 30 may be optional in some embodiments and is configured to apply a resistance force to the steering input device 26 to resist movement of the steering input device 26.

The steering input device 26 may comprise a steering wheel, joystick, knob, rocker switch, etc. In some embodiments, the steering input device 26 includes a controller configured to generate instructions for self-driving of the vehicle 110 and the steering position sensor 28 and tactile feedback device 30 may be omitted.

The tactile feedback device 30 may comprise a stepper motor, a brushless DC motor, an electromagnetic brake, a constant resistance bearing arrangement, a linear actuator, or any other suitable alternative for applying the resistance force to the steering input device 26. The tactile feedback device 30 is coupled with the steering input device 26 and with a body of the vehicle 110 and connected to the controller 14 as shown in FIG. 3. The tactile feedback device 30 is configured to apply the resistance forces to the steering input device 26 to provide tactile feedback to the operator of the vehicle 110.

In some embodiments, such as the illustrative embodiment, the tactile feedback device 30 is able to vary the resistance force applied to the steering input device 26 based on instructions from the controller 14. Illustratively, the tactile feedback device 30 includes a rotor suspended in a magnetically responsive fluid and the controller 14 is configured to energize a coil near the magnetically responsive fluid to create a magnetic field in the tactile feedback device 30 to cause the rotor to resist rotation and therefore apply the resistance force to the steering input device 26. In some embodiments, the tactile feedback device 30 is omitted and the steering input device 26 is connected directly with the controller 14.

Illustratively, the steering position sensor 28 is an encoder configured to detect a rotational position of the steering input device, in this example, a steering wheel. In the illustrative embodiment, the steering position sensor 28 is integrated with the tactile feedback device 30. In other embodiments, the steering position sensor 28 is integrated with the steering input device 26.

The actuator 18 is an electric actuator as shown in FIGS. 2-5. Reference is hereby made to U.S. application Ser. No. 17/703,395, filed Mar. 24, 2022 entitled ELECTRIC ACTUATOR STEERING SYSTEM FOR FORKLIFTS and which claims priority to provisional patent application Ser. No. 63/173,695, filed Apr. 12, 2021 for disclosure relating to the actuator in accordance with the present disclosure, such application is hereby incorporated by reference in its entirety herein.

Figure 4:
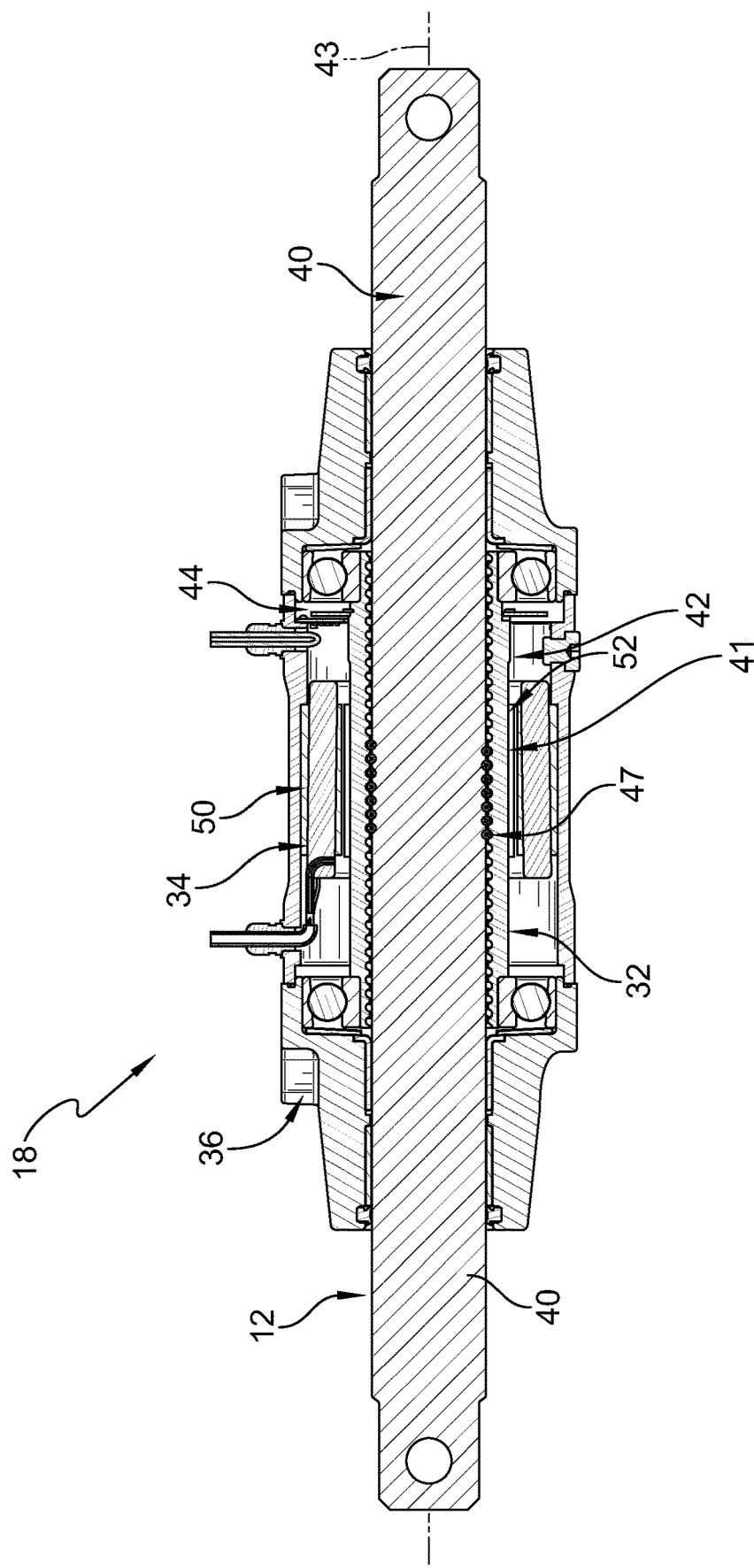
FIG. 4 is a section view of the actuator of FIG. 2 showing that the actuator includes a ball screw nut coupled with an electric motor, an actuator rod, and a rotational position sensor configured to determine an angular position of the ball screw nut which is used by the system's controller to determine a position of the steered wheels.
Figure 5:
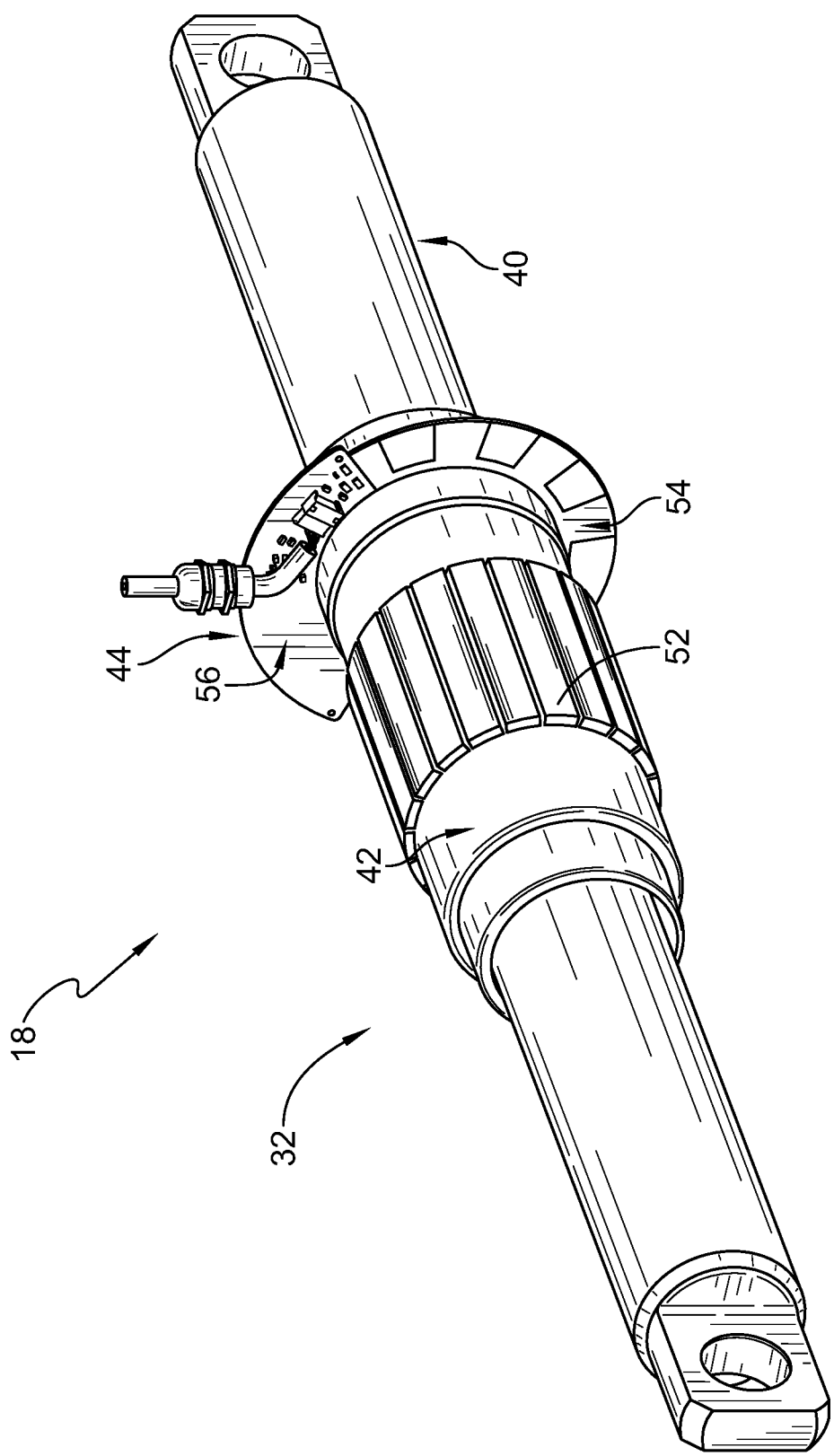
FIG. 5 is a perspective view of components of the actuator of FIG. 4 showing the actuator rod, the ball screw nut arranged around the actuator rod, magnets of the electric motor coupled with the ball screw nut, and the rotational position sensor arranged around the ball screw nut.

The actuator 18 includes a linear actuation unit 32, an electric motor 34, and a housing assembly 36 as shown in FIGS. 4 and 5. The linear actuation unit 32 is coupled with the steered wheels 20 and is configured to translate relative to the housing assembly 36 to cause a change in the angle of the steered wheels 20 in response to an input from the controller 14 based on the steering input device 26. The electric motor 34 is coupled to the linear actuation unit 32 and the controller 14 and configured to rotate selectively to cause the linear actuation unit 32 to translate in response to power being supplied to the electric motor 34. The housing assembly 36 is arranged around the electric motor 34 and includes a casing, seals, bearings, etc. to assist in the movement of the linear actuation unit 32.

The steer-by-wire control system 10 further includes an actuator mount assembly 24 that couples the actuator 18 to the vehicle 110 and the steered wheels 20 as shown in FIG. 3. The actuator mount assembly 24 includes tire rod assemblies 45, 46 and a mount 48. The electric actuator 18 is connected to the steered wheels 20 via tie rod assemblies 45, 46 that are coupled to the mount 48. The mount 48 is coupled to the body of the vehicle 110 for movement with the vehicle 110.

Figure 6:
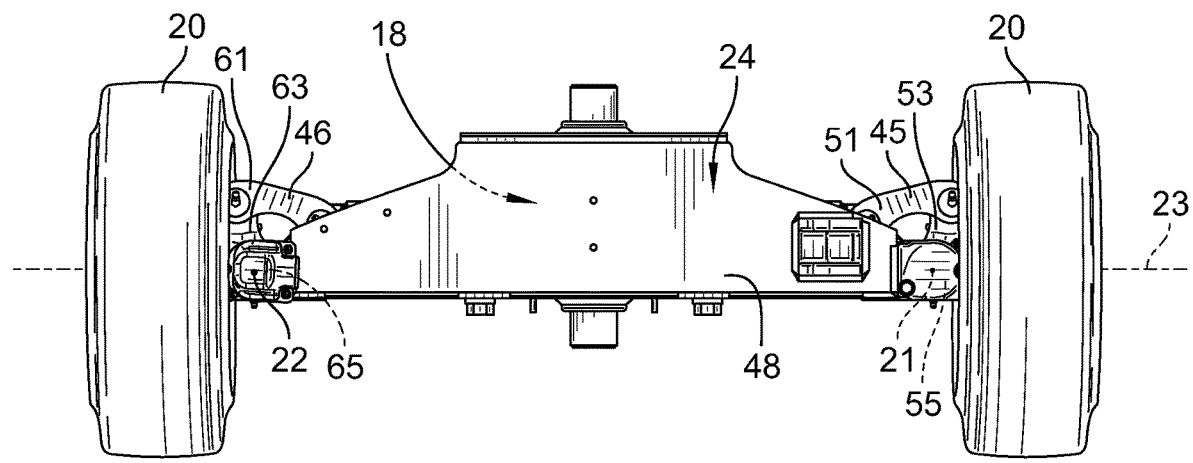
FIG. 6 is a top view of the steering assembly of FIG. 2 showing the steered wheels in a center position and the actuator rod in a zero-stroke position such that the steered wheels direct the vehicle in a straight path.
Figure 7:
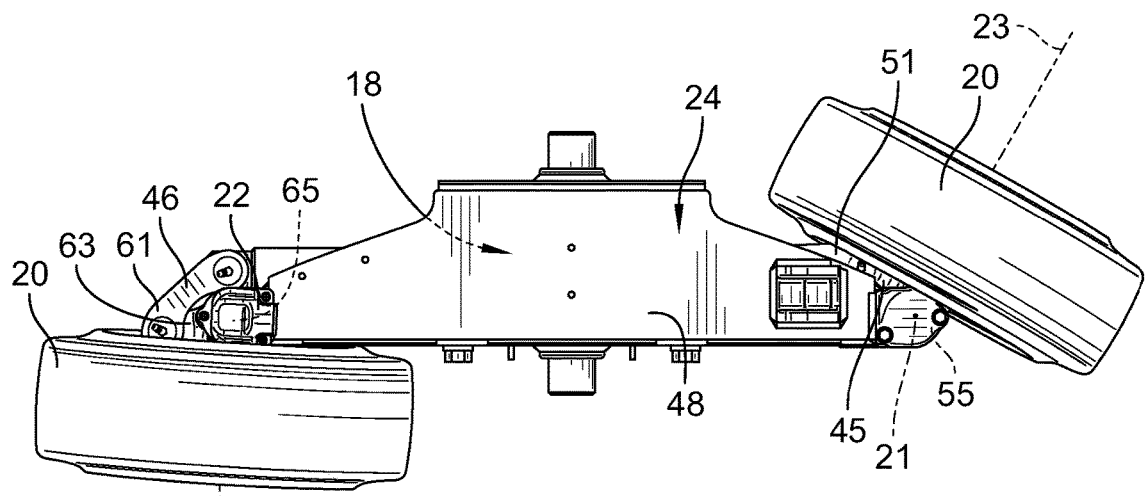
FIG. 7 is a top view of the steering assembly of FIG. 2 showing the steered wheels in a maximum turn angle position and the actuator rod in a fully stroked position in which the actuator rod is blocked from further movement by the controller, the maximum turn angle position corresponding with the steered wheels directing the vehicle in a minimum turn curved path.

The tie rod assembly 45 includes a tie rod 51, a steering knuckle 53, and a kingpin 55 and the tie rod assembly 46 includes a tie rod 61, a steering knuckle 63, and a kingpin 65 as shown in FIGS. 3, 6, and 7. The tie rods 51, 61 are coupled with the actuator rod 40 and the respective steering knuckle 53, 63. The steering knuckles 53, 63 are coupled with the steered wheels 20 and the kingpins 55, 65. The steering knuckles 53, 63 are supported by the mount 48.

The linear actuation unit 32 of the actuator 18 includes an actuator rod 40, a rotor 41 configured to rotate about an axis 43 to cause the actuator rod 40 to move, and a rotation position sensor 44 as suggested in FIGS. 4 and 5. Illustratively, the rotor 41 includes a ball screw nut 42 and a plurality of balls 47. The actuator rod 40 extends along the axis 43 between a first end and a second end of the actuator rod 40. The first end and the second end of the actuator rod 40 are coupled with the tie rod assemblies 45, 46 and configured to move the tie rod assemblies 45, 46 to change the angle of the steered wheels 20 in response to translation of the actuator rod 40. The ball screw nut 42 is arranged circumferentially around the actuator rod 40 and configured to convert rotation of the ball screw nut 42 into linear translation of the actuator rod 40. The plurality of balls 47 are located radially between the actuator rod 40 and the ball screw nut 42 and transmit forces from the ball screw nut 42 to the actuator rod 40 to move the actuator rod 40.

The rotation position sensor 44 is coupled with the ball screw nut 42 and the housing assembly 36 as shown in FIGS. 4 and 5. The rotation position sensor 44 is configured to determine a rotational position of the ball screw nut 42 relative to the axis 43 which allows the controller 14 to calculate an axial location of the actuator rod 40 relative to the housing assembly 36 or electric motor 34. In some embodiments, the controller 14 further calculates the axial location of the actuator rod 40 using data from a linear position sensor such as a proximity sensor in the housing assembly 36 and/or using the tire angle sensor 22.

The rotation position sensor 44 includes a position target board 54 and an arcuate sensor board 56 as shown in FIGS. 4 and 5. The position target board 54 extends fully around the axis 43 in the illustrative embodiment and is coupled with the ball screw nut 42 for rotation with the ball screw nut 42. The arcuate sensor board 56 is located axially near or adjacent the position target board 54 and is fixed with the housing assembly 36. The arcuate sensor board 56 illustratively extends only partway around the axis 43 in the illustrative embodiment. A retainer ring is located in a retainer ring slot formed in the ball screw nut 42 and blocks axial movement of the position target board 54.

The position target board 54 includes a plurality of conductive targets on its body as shown in FIG. 5. The targets are spaced apart from one another circumferentially. The arcuate sensor board 56 includes a body and electronics coupled with the body. The arcuate sensor board 56 is located axially adjacent the position target board 54 and the electronics are configured to detect the conductive targets on the position target board 54 as they move circumferentially past the electronics during rotation of the ball screw nut 42. The arcuate sensor board 56 is connected with the steering controller 60 and configured to transmit data indicative of the rotational position of the ball screw nut 42 to the steering controller 60 based on the location and/or movement of the conductive targets.

The rotation position sensor 44 is configured to generate an angular position signal that is indicative of the angular position of the ball screw nut 42 relative to the axis 43. As the ball screw nut 42 rotates about the axis 43, the actuator rod 40 moves axially and causes the steered wheels 20 to turn. Because of this, the ball screw nut 42 will be in the same angular position for a number of different axial positions of the actuator rod 40 and, thus, a number of different steered wheel 20 angles. For example, if the ball screw nut 42 starts at a zero degree (0 degree) position, the actuator rod 40 will be at a first position. Rotating the ball screw nut 42 by 360 degrees will cause the actuator rod 40 to move, but the ball screw nut 42 will again be at the zero degree (0 degree) position as read by the rotation position sensor 44.

In the illustrative embodiment, the rotation position sensor 44 detects the angular position of the ball screw nut 42, but not additional information such as the axial location of the actuator rod 40. As a result, the controller 14 can count the rotations and/or angles of rotation of the ball screw nut 42 based on the rotation position sensor 44 and determine an amount of relative movement of the actuator rod 40 and, thus, a relative angle change of the steered wheels 20. However, the controller 14 cannot determine the absolute axial location of the actuator rod 40 or angle of the steered wheels 20 with only the angular position signal. As discussed further below, the tire angle sensor 22 provides additional information to the controller 14 to allow the controller 14 to determine and track the absolute axial location of the actuator rod 40 and angle of the steered wheels 20 to control the direction of the steered wheels 20.

The electric motor 34 includes a stator 50 and a plurality of magnets 52 as shown in FIGS. 4 and 5. The stator 50 is configured to produce a magnetic field and the plurality of magnets 52 are configured to cause the ball screw nut 42 to rotate in response to the alternating magnetic field. The stator 50 includes a core of laminations and windings that extend circumferentially around the axis 43 and are coupled with the core. The core is an annular component that is fixed to the housing assembly 36.

The plurality of magnets 52 are located radially inward of the stator 50 as shown in FIG. 4. The plurality of magnets 52 are coupled to an outer surface of the ball screw nut 42. In the illustrative embodiment, the plurality of magnets 52 are fixed directly to the ball screw nut 42 and the magnets 52 and ball screw nut 42 cooperate to form the rotor 41. In other embodiments, the plurality of magnets 52 are coupled to another component such as a sleeve (not shown) which is coupled to the ball screw nut 42. In the illustrative embodiment, the plurality of magnets 52 are permanent magnets.

The steered wheels 20 are coupled to the actuator 18 and are each configured to rotate about a first axis 21 (measured by angle change) to change a direction of travel of the vehicle 110 and to rotate (measured by revolutions per minute, RPM) about a second axis 23 to cause the vehicle 110 to be propelled relative to ground underlying the vehicle 110 as suggested in FIGS. 1 and 2. The steered wheels 20 have a center position in which the steered wheels direct the vehicle 110 in a straight path as shown in FIG. 6. The steered wheels 20 are configured to turn in either direction away from the center position up to a maximum turn position to turn the vehicle 110 as suggested in FIG. 7.

The actuator 18 has a zero-stroke position in which the actuator rod 40 is generally centered in its range of movement as suggested in FIGS. 4 and 6. The actuator 18, tie rods 45, 46, and steered wheels 20 are configured such that the steered wheels 20 are in the center position in response to the actuator 18 being in the zero-stroke position.

The actuator 18 has two full-stroke positions in which the actuator rod 40 is moved in either direction along the axis 43 away from the zero-stroke position by a maximum amount allowed by the controller 14. The steered wheels 20 are configured such that the steered wheels 20 are in one of two full turn positions in response to the actuator 18 being in one of the corresponding full-stroke positions as suggested in FIG. 7.

In the illustrative embodiment, the controller 14 is programmed to block the actuator rod 40 from moving axially beyond the full-stroke positions. In other words, the controller 14 does not send instructions and/or power to the motor 34 if doing so would cause the actuator rod 40 to move beyond the full-stroke position. However, the actuator rod 40 is physically able to be moved some amount beyond the full-stroke positions if a sufficient force is applied to the steered wheels 20, for example. In one example, an external force to one of the steered wheels 20 may physically cause the actuator rod 40 to be moved beyond the full-stroke position due to the mechanical linkage between the steered wheels 20 and the actuator rod 40.

The tire angle sensor 22 is configured to measure the angle of the steered wheels 20 and generate a tire angle signal indicative of the measured angle of the steered wheels 20. The tire angle sensor 22 is coupled with the steering knuckle 63 included in the tie rod assembly 46 in the illustrative embodiment as shown in FIGS. 2 and 3. The tire angle sensor includes a potentiometer configured to measure an angle of the king pin 65 included in the tie rod assembly 46 and, thus, measure an angle of the steered wheels 20. In other embodiments, other suitable measurements may be used to determine the angle of the steered wheels 20. In other embodiments, other sensors and sensor locations are used to measure the angle of the steered wheels 20. The tire angle sensor 22 is connected with the controller 14 to transmit the tire angle signal to the controller 14. Illustratively, the tire angle sensor 22 is configured to transmit the tire angle signal to the vehicle controller 62 and the vehicle controller 62 transmits the data to the steering controller 60.

The controller 14 illustratively includes the steering controller 60, the vehicle controller 62, a battery 64, and a user interface 66 as shown in FIG. 3. The steering controller 60 is configured for controlling the steered wheels 20 based on input received from the steering input system 16 and the vehicle controller 62. The vehicle controller 62 controls other aspects of the vehicle 110 and receives data from a tire angle sensor 22. Among other uses of the tire position sensor data, the vehicle controller 62 transmits the tire position sensor data to the steering controller 60. The battery 64 is electrically connected to the steering controller 60 and the vehicle controller 62.

The steering controller 60 is configured to regulate the flow of electric energy from the battery 64 to the electric motor 34 of the actuator 18 for powering movement of the electric actuator 18. Electrical connections are depicted as broken lines in FIGS. 2 and 3. Each of the steering controller 60 and the vehicle controller 62 include a memory and a processor configured to execute instructions stored on the memory. In other embodiments, the controller 14 may include a single processor and memory instead of the two controllers 60, 62.

Figure 8:
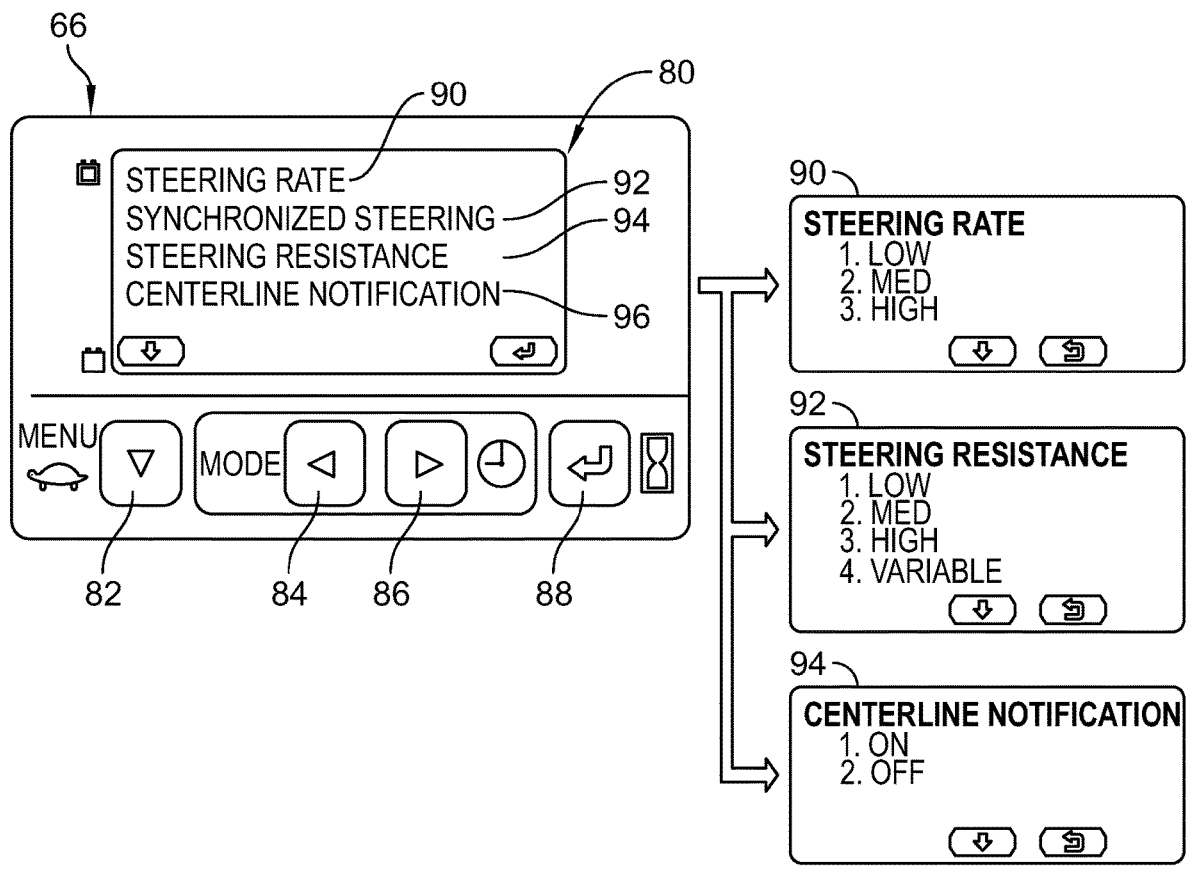
FIG. 8 is a diagrammatic view of a user interface of the steer-by-wire control system showing that a number of features of the system can be activated and/or varied by the vehicle operator or manufacturer.

The user interface 66 is adapted to receive input from the vehicle operator or manufacturer to activate, deactivate, and vary features of the system 10, among other things, as suggested in FIG. 8. The user interface includes a display 80 and a plurality of input elements 82, 84, 86, 88. The display 80 is a touchscreen and the input elements 82, 84, 86, 88 are illustratively buttons on the touchscreen. In other embodiments, the display 80 is not a touch screen. In other embodiments, the input elements 82, 84, 86, 88 include press buttons, switches, knobs, joysticks, etc.

The controller 14 is programmed to stop the electric motor 34 from moving the actuator rod 40 too far and, thus, stop the tie rod assemblies 45, 46 from engaging stop flanges on the housing assembly 36. The controller 14 is programmed to block movement of the actuator rod 40 at a predetermined location for each end of the full-stroke positions of the actuator rod 40 and the predetermined location is selected such that the first end and second end of the actuator rod 40 and/or tie rod assemblies 45, 46 are spaced apart from the stop flanges. Though the controller 14 blocks the electric motor 34 from moving the actuator rod 40 to cause engagement of the stop flanges, an external force could overcome the internal resistance of the ball screw nut 42, etc. and push the actuator rod 40 into the housing assembly 36 and cause one of the tie rod assemblies 45, 56 to engage the respective stop flange.

Illustratively, the controller 14 is configured to use the data from the rotational position sensor 44 to determine a relative position of the actuator rod 40. In the illustrative embodiment, the controller 14 is configured to use the data from the rotational position sensor 44 to determine an angle of the ball screw nut 42 relative to the arcuate sensor board 56. As a result, the controller 14 is able to determine one of a finite plurality of axial locations of the actuator rod 40 based on the angle of the ball screw nut 42. The controller 14 uses the data from the tire angle position sensor 22 to determine a baseline position of the actuator rod 40 at startup of the controller 14. The controller 14 then uses the relative angle change of the ball screw nut 42 based on the rotational position sensor 44 and the baseline position to control the axial position of the actuator rod 40, a calculated tire angle, or other calculated measurements.

The controller 14 has a preset maximum angular limit values for rotating the ball screw nut 42 stored in memory. The maximum angular limit values for rotating the ball screw nut 42 correspond with the full-stroke positions of the actuator rod 40. In other words, the controller 14 knows the ball screw nut 42 may be rotated a predetermined number of rotations and/or angles from a starting position until it reaches the maximum angular limit value, at which point the actuator rod 40 is at one of the full-stroke positions.

At start up, the controller 14 is configured to determine a calculated linear position of the actuator rod 40 relative to the ball screw nut 42 based on the tire angle signal received from the tire angle sensor 22. As an example, the tire angle sensor 22 may generate a signal indicating the steered wheels 20 are turned to 20 degrees and the controller 14 calculates the linear position of the actuator rod 40 based on the angle of the steered wheels. In some embodiments, calculating the linear position of the actuator rod 40 is performed by interpolating the position based on the tire angle signal by using a look up table of actuator rod positions and tire angle signal data stored on the memory.

The calculated linear position of the actuator rod 40 can then be used with the signal from the rotational position sensor 44 to relate the actuator rod 40 linear position with the angular rotational position of the ball screw nut 42. The controller 14 is therefore able to determine a starting or baseline position of the actuator rod 40 and steered wheels 20 using the signal from the tire angle sensor 22 at start up. It then changes the position of the actuator rod 40 and the angle of the steered wheels 20 in response to input from the steering input device 26 by rotating the ball screw nut 42. The controller 14 further tracks the changing position of the actuator rod 40 and the angle of the steered wheels 20 using the signal from the rotational position sensor 44 and counting the rotation of the ball screw nut 42. The controller 14 blocks the motor 34 from rotating the ball screw nut 42 beyond the maximum angular limit so that the actuator rod 40 is not over stroked.

In some embodiments, the controller 14 is programmed to periodically or on demand reset the starting or baseline calculated linear position of the actuator rod 40 using the signal from the tire angle sensor 22 during use of the vehicle 110. This may remove any hysteresis or inaccuracies in the system caused by vehicle use, external forces, etc.

In some embodiments, the controller 14 is programmed to rotate the steered wheel 20 relative to ground in a first direction in response to rotation of the steering wheel 26. The controller 14 is programmed to determine an angle of the steered wheel 20. In some embodiments, the controller 14 uses only the data from the sensor 22 for all operations of the vehicle 110. In other embodiments, the controller 14 uses the sensor 22 to obtain an initial angle of the steered wheel 20 and then uses the rotational position sensor 44 to track relative movement of the steered wheel 20. The controller 14 is programmed to block rotation of the steered wheel 20 in the first direction and allow further rotation of the steering wheel 26 in response to the angle of the steered wheel 20 being equal to or greater than a maximum and preset turn angle limit of the steered wheel 20.

Figure 9:
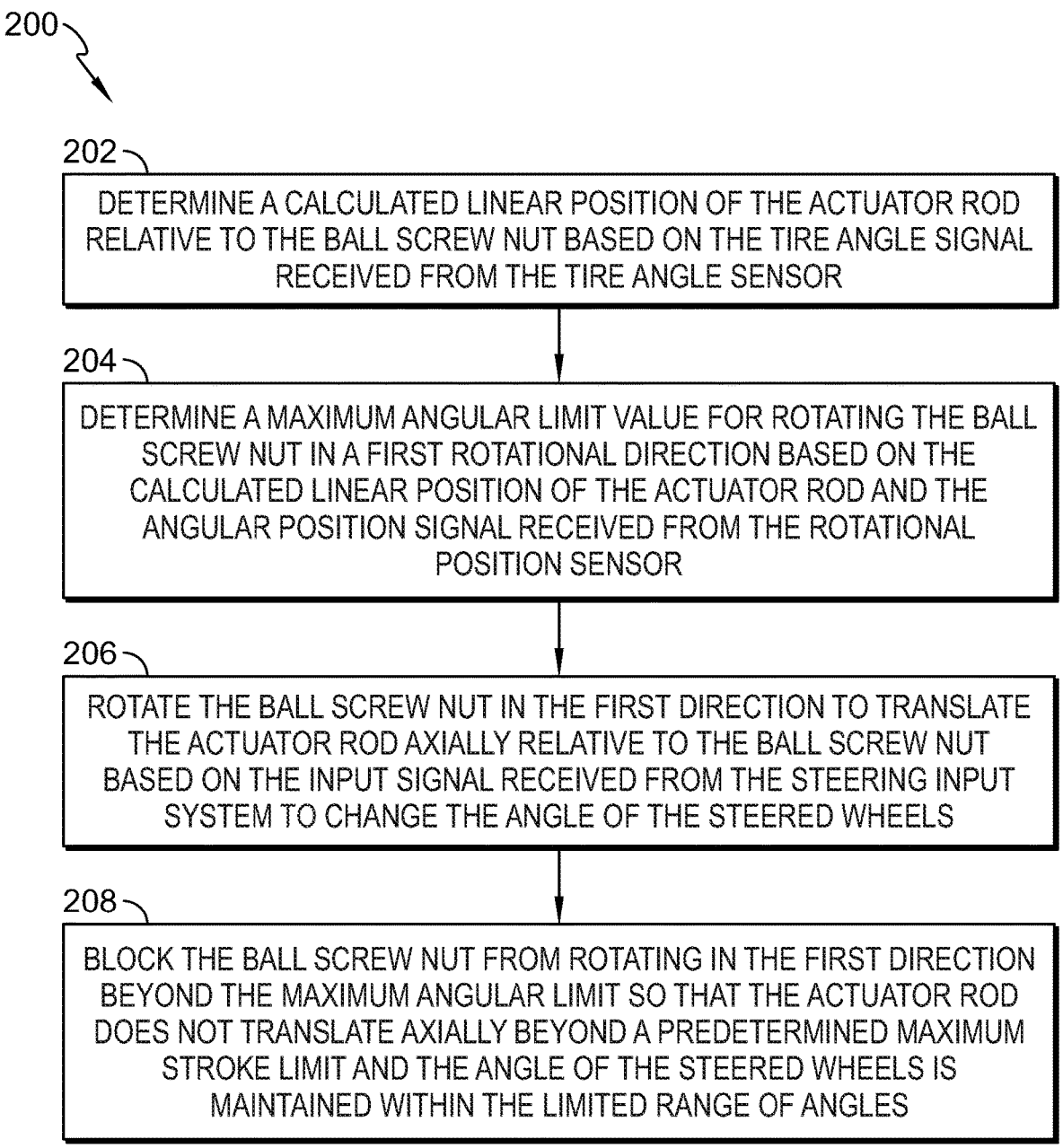
FIG. 9 is a diagrammatic view of a method of calibrating and controlling the actuator and steered wheels to block over stroking the actuator rod, the method being stored on and executable by the controller of the steer-by-wire control system.

According to one embodiment, the memory in the controller 14 includes instructions that, when executed by the processor, cause the controller 14 to perform a number of steps as shown in method 200 of FIG. 9. The method 200 may begin at vehicle key on such as when the vehicle is started. The method may begin in response to a manual input to perform the method 200 or any portion of the method 200. The method 200 or any portion of the method 200 may be programmed to be performed automatically by the controller 14 periodically.

The method 200 includes a step 202 in which the controller 14 determines a calculated linear position of the actuator rod 40 relative to the ball screw nut 42 based on the tire angle signal received from the tire angle sensor 22 as shown in FIG. 9. As an example, the controller 14 reads a voltage from the tire angle sensor 22 and converts the voltage reading in to a tire angle using a linear interpolation calculation. The controller 14 uses a look-up table, in the illustrative embodiment, and performs a linear interpolation to convert the tire angle into an actuator stroke position. The stroke position may not track linearly with the tire angle change and the linear interpolation is used to determine the actuator stroke position.

In a step 204, the controller 14 determines a maximum angular limit value for rotating the ball screw nut 42 in a first rotational direction based on the calculated linear position of the actuator rod 40 and the angular position signal received from the rotational position sensor 44 as shown in FIG. 9. In the illustrative embodiment, the maximum angle of rotation of the ball screw nut 42 for each direction are preset on the controller 14. The controller 14 is configured to use the linear position of the actuator rod 40 and the angular position signal from the rotational position sensor 44 to determine and track the position of the ball screw nut 42 and the actuator rod 40. The controller 14 can, therefore, determine the maximum rotations the ball screw nut 42 may perform in a direction before the actuator rod 40 is at the corresponding maximum stroke position.

At a step 206, the controller 14 rotates the ball screw nut 42 in the first direction to translate the actuator rod 40 axially relative to the ball screw nut 42 based on the input signal received from the steering input system 16 to change the angle of the steered wheels 20 as shown in FIG. 9. The controller 14 is programmed with the ball screw gear ratio which correlates the ball screw nut 42 rotation with actuator rod 40 stroke length. Using the initial position of the actuator rod 40, the ball screw nut 42 gear ratio, and number of ball screw nut 42 rotations, the controller is able to determine and track the actuator rod 40 position. The controller 14 is programmed to rotate the ball screw nut 42 in response to an angle of the ball screw nut 42 being less than the maximum angle limit value.

In the illustrative embodiment, the steering input system 16 uses a rotary encoder shafted directly to the steering input device and the sends a command position to the steering controller 60. The steering controller 60 determines an amount to rotate the ball screw nut 42 based on the input from the rotary encoder.

At a step 208, the controller 14 blocks the ball screw nut 42 from rotating in the first direction beyond the maximum angular limit so that the actuator rod 40 does not translate axially beyond a predetermined maximum stroke limit and the angle of the steered wheels 20 is maintained within the limited range of angles as shown in FIG. 9. In the illustrative embodiment, the controller 14 blocks power from being supplied to the electric motor 34 so that the motor 34 cannot rotate the ball screw nut 42 further. Illustratively, the controller 14 is programmed to block the ball screw nut 42 in response to the angle of the ball screw nut 42 being equal to or granter than the maximum angular limit value.

As shown in FIG. 8, the user interface 66 may be used to customize the operation of the steer-by-wire system 10. The controller 14 is programmed to rotate the ball screw nut 42 in the first direction by an amount based on the input signal received from the steering input system 16 according to a lock-to-lock ratio. The lock-to-lock ratio is indicative of the angle the steered wheels 20 are turned compared to the input signal from the steering input device 26, such as for example, the amount a steering wheel is turned. The controller 14 is configured to rotate the ball screw nut 42 with the electric motor by a set amount based on the input signal from the steering input device 26 and the lock-to-lock ratio. As an example, the controller 14 rotates the ball screw nut 42 more for a given input signal if the lock-to-lock ratio is high and rotates the ball screw nut 42 less for that same given input if the lock-to-lock ratio is low or lowered.

In some embodiments, the controller 14 is programmed to select the lock-to-lock ratio based on input received from an operator, for example, using a steering rate menu 90. In the illustrative embodiment, the lock-to-lock ratio is selected from a group of only three lock-to-lock ratio choices as suggested in FIG. 8. The three choices correspond with a low, medium, and high lock-to-lock ratio that are preprogramed values in the controller 14.

The steering input system 16 includes the tactile feedback device 30 which is configured to apply a resistance force to the steering input device 26 to resist movement of the steering input device 26 by the operator. In some embodiments, the resistance force applied to the steering input device 26 is variable and can be selected by the operator as suggested in FIG. 8. In the illustrative embodiment, the steering input device 26 is a steering wheel and the tactile feedback device 30 includes an electromagnetic brake coupled with the steering wheel. In other embodiments, the tactile feedback device 30 includes a stepper motor coupled with the steering wheel.

In some embodiments, the controller 14 is programmed to select a default magnitude of the resistance force based on an input received from the operator. The resistance force may be applied with the default magnitude for all movement of the steering input device 26 and for all system 10 and vehicle 110 scenarios.

The default magnitude may be selected via the user interface 66 using a menu such as menu 92 in FIG. 8. The default magnitude may be set at a low, medium, or high setting wherein the default magnitude is increased from low to high. The menu 92 further allows for the operator to select a variable magnitude for the resistance force. The magnitude of the resistance force may vary for different scenarios as described below.

In some embodiments, the controller 14 is programmed to vary the resistance force in response to a change in revolutions per minute of the steered wheels 20. For example, the controller 14 increases the resistance force applied to the steering input device 26 in response to the steered wheels 20 rotating faster (the vehicle 110 moving faster). In one embodiment, the resistance force is increased by a set amount in response to the steered wheels 20 rotating faster than a preset speed value. In some embodiments, the resistance force is increased by a proportion related to the relative increase in speed of the steered wheels 20. In response to the steered wheels 20 rotating slower and/or rotating below the set amount, the resistance force is reduced and/or returned to the default magnitude. This variable resistance causes the steering input device 26, such as a steering wheel, to be harder to turn and, thus, harder to turn the vehicle 110 the faster the vehicle 110 is traveling. This may provide the operator improved control over the vehicle 110 at increased travel speeds.

In some embodiments, the controller 14 is programmed to vary the resistance force applied to the steering input device 26 by the tactile feedback device 30 in response to the steered wheels 20 being moved to the center position, shown in FIG. 6, in which the steered wheels 20 direct the vehicle 110 in a straight line. This feature gives the operator feedback to know the steered wheels 20 are centered. The operator may select for this feature to be turned off or turned on via the user interface 66 using a menu such as menu 94.

The resistance force may be increased for a set time and return to the default magnitude after the time has expired. The set time may be equal to about a fraction of a second, about one second, or less than about three seconds. The resistance force may be increased by a set magnitude and then returned to the default magnitude. The controller 14 does not increase the force again, until after a predetermined period of time expires or after the steered wheels 20 are turned to or beyond a preset angle.

As one example, the controller 14 is programmed to reduce the resistance force in response to an expiration of the preset amount of time after the steered wheels 20 were moved to the center position. In some embodiments, the controller 14 is programmed to block an increase in the resistance force in response to the steered wheels 20 being moved back to the center position unless the steered wheels 20 have first been turned by an angle greater than a preset angle away from the center position. The preset angle may be 20 degrees, 15 degrees, 10 degrees, 5 degrees, or any other suitable angle amount.

In some embodiments, the controller 14 is programmed to vary the resistance force in response to the steered wheels 20 i) being moved to a center position and ii) the steered wheels 20 rotating within a predetermined revolutions per minute range. In such scenarios, the resistance force is varied or increased when the steered wheels 20 are moved to the center position only if the vehicle 110 is moving slow as determined by the RPM range of the steered wheels 20. If the steered wheels 20 (and therefore vehicle 110) are moving faster than that speed, the resistance force does not vary due to the steered wheels 20 moving to or through the center position. The predetermined revolutions may be less than about 10 RPM, less than about 7 RPM, less than about 6 RPM, less than about 5 RPM, or less than about 4 RPM. In some embodiments, the controller 14 is programmed to increase the resistance force in response to an increase in a travel speed of the steered wheels over the ground.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A steer-by-wire control system for use with a material handling vehicle, the control system comprising:
   a steering assembly including:
   steered wheels supported on ground underlying the steered wheels, the steered wheels adapted to turn relative to the ground to set a direction of travel of the material handling vehicle,
   a tire angle sensor configured to generate a tire angle signal indicative of a measured angle of the steered wheels,
   a steering input system configured to generate a steering signal indicative of a desired angle of the steered wheels,
   an actuator that includes a ball screw nut, an actuator rod, and a rotation position sensor, the ball screw nut configured to rotate about an axis to cause the actuator rod to translate axially along the axis relative to the ball screw nut, the actuator rod coupled with the steered wheels to change an angle of the steered wheels relative to the ground in response to translating axially relative to the ball screw nut, and the rotation position sensor configured to generate an angular position signal indicative of an angular position of the ball screw nut relative to the axis; and
   a controller connected with the steering input system, the tire angle sensor, and the actuator and configured to vary the angle of the steered wheels within a limited range of angles, the controller programmed to:
   determine a calculated linear position of the actuator rod relative to the ball screw nut based on the tire angle signal received from the tire angle sensor,
   determine a maximum angular limit value for rotating the ball screw nut in a first rotational direction based on the calculated linear position of the actuator rod and the angular position signal received from the rotational position sensor, rotate the ball screw nut in the first direction to translate the actuator rod axially relative to the ball screw nut based on the input signal received from the steering input system to change the angle of the steered wheels, and block the ball screw nut from rotating in the first direction beyond the maximum angular limit so that the actuator rod does not translate axially beyond a predetermined maximum stroke limit and the angle of the steered wheels is maintained within the limited range of angles.

2. The steer-by-wire control system of claim 1, wherein determining the calculated linear position of the actuator rod includes interpolating the calculated linear position based on the tire angle signal using a look-up table.

3. The steer-by-wire control system of claim 1, wherein the controller is programmed to rotate the ball screw nut in the first direction by an amount based on the input signal received from the steering input system according to a lock-to-lock ratio and the controller is programmed to select the lock-to-lock ratio based on input received from an operator.

4. The steer-by-wire control system of claim 3, wherein the lock-to-lock ratio is selected from a group of only three lock-to-lock ratio choices.

5. The steer-by-wire control system of claim 1, wherein the steering input system includes a steering input device and a tactile feedback device coupled with the steering input device and configured to apply a resistance force to the steering input device to resist movement of the steering input device by an operator and the controller is programmed to select a default magnitude of the resistance force based on an input received from the operator.

6. The steer-by-wire control system of claim 5, wherein the steering input device is a steering wheel and the tactile feedback device includes an electromagnetic brake coupled with the steering wheel.

7. The steer-by-wire control system of claim 5, wherein the steering input device is a steering wheel and the tactile feedback device includes a stepper motor coupled with the steering wheel.

8. The steer-by-wire control system of claim 1, wherein the steering input system includes a steering input device and a tactile feedback device coupled with the steering input device and configured to apply a resistance force to the steering input device to resist movement of the steering input device by an operator and the controller is programmed to increase the resistance force in response to an increase in revolutions per minute of the steered wheels.

9. The steer-by-wire control system of claim 1, wherein the steering input system includes a steering input device and a tactile feedback device coupled with the steering input device and configured to apply a resistance force to the steering input device to resist movement of the steering input device by an operator and the controller is programmed to vary the resistance force applied to the steering input device in response to the steered wheels being moved to a center position in which the steered wheels direct the material handling vehicle in a straight line.

10. The steer-by-wire control system of claim 9, wherein the controller is programmed to reduce the resistance force in response to an expiration of a preset amount of time after the steered wheels were moved to the center position.

11. The steer-by-wire control system of claim 9, wherein the controller is programmed to block an increase in the resistance force in response to the steered wheels being moved back to the center position unless the steered wheels have first been turned by an angle greater than a preset angle away from the center position.

12. The steer-by-wire control system of claim 1, wherein the steering input system includes a steering input device and a tactile feedback device coupled with the steering input device and configured to apply a resistance force to the steering input device to resist movement of the steering input device by an operator and the controller is programmed to vary the resistance force in response to the steered wheels i) being moved to a center position and ii) the steered wheels rotating within a predetermined revolutions per minute range.

13. A steer-by-wire control system comprising:
a steering assembly including:
steered wheels,
a tire angle sensor configured to generate a tire angle signal indicative of a measured angle of the steered wheels,
a steering input system configured to generate a steering signal indicative of a desired angle of the steered wheels,
an actuator that includes a rotor, an actuator rod, and a rotation position sensor, the rotor configured to rotate to cause the actuator rod to move relative to the rotor, the actuator rod coupled with the steered wheels, and the rotation position sensor configured to generate an angular position signal indicative of an angular position of the rotor relative to the axis; and
a controller programmed to:
determine a linear position of the actuator rod relative to the rotor based on the tire angle signal,
determine a maximum angular limit value for rotating the rotor in a first rotational direction based on the linear position of the actuator rod and the angular position signal,
rotate the rotor in the first direction to move the actuator rod relative to the rotor based on the input signal in response to an angle of the rotor being less than the maximum angular limit value, and
block the rotor from rotating in the first direction in response to the angle of the rotor being equal to or greater than the maximum angular limit value.

14. The steer-by-wire control system of claim 13, wherein the controller is programmed to stop electric power from going to the actuator to block the rotor from rotating in the first direction.

15. The steer-by-wire control system of claim 13, wherein the controller is programmed to rotate the rotor in the first direction by an amount based on the input signal received from the steering input system according to a lock-to-lock ratio and the controller is programmed to select the lock-to-lock ratio based on input received from an operator.

16. The steer-by-wire control system of claim 13, wherein the steering input system includes a steering input device and a tactile feedback device coupled with the steering input device and configured to apply a resistance force to the steering input device to resist movement of the steering input device by an operator and the controller is programmed to select a default magnitude of the resistance force based on an input received from the operator.

17. The steer-by-wire control system of claim 13, wherein the steering input system includes a steering input device and a tactile feedback device coupled with the steering input device and configured to apply a resistance force to the steering input device to resist movement of the steering input device by an operator and the controller is programmed to increase the resistance force in response to an increase in a travel speed of the steered wheels over the ground.

18. A method comprising:
  rotating a steered wheel of a vehicle relative to ground in a first direction in response to rotation of a steering wheel of the vehicle,
  determining an angle of the steered wheel, and
  blocking rotation of the steered wheel in the first direction and allowing further rotation of the steering wheel in response to the angle of the steered wheel being equal to or greater than a maximum preset turn angle limit of the steered wheel,
  wherein determining an angle of the steered wheel includes measuring directly an angle of the steered wheel with a sensor.

19. The method of claim 18, further comprising determining an angular position of a rotor relative to an actuator rod included in an actuator coupled with the steered wheel, determining a linear position of the actuator rod relative to the rotor based on the angle of the steered wheel,
  determining a maximum angular limit value for rotating the rotor in a first rotational direction based on the linear position of the actuator rod and the angular position of the rotor,
  rotating the rotor in the first direction to translate the actuator rod relative to the rotor in response to rotation of the steering wheel and an angle of the rotor being less than the maximum angular limit value, and
  blocking the rotor from rotating in the first direction in response to the angle of the rotor being equal to or greater than the maximum angular limit value to block rotation of the steered wheel in the first direction and allow further rotation of the steering wheel in response to the angle of the steered wheel being equal to or greater than the maximum turn angle limit of the steered wheel.

* * * * *